United States Patent [19]

Wilson et al.

[11] Patent Number: 4,799,210

[45] Date of Patent: Jan. 17, 1989

[54] FIBER OPTIC READ/WRITE HEAD FOR AN OPTICAL DISK MEMORY SYSTEM

[75] Inventors: Mark L. Wilson, Vadnais Heights; Bernard S. Fritz, Eagan, both of Minn.

[73] Assignee: Unisys Corporation, Blue Bell, Pa.

[21] Appl. No.: 927,213

[22] Filed: Nov. 5, 1986

[51] Int. Cl.⁴ ............................................. G11B 7/12
[52] U.S. Cl. .................... 369/110; 369/111; 369/54; 369/112; 369/106; 369/116; 250/205
[58] Field of Search ................ 369/100, 111, 32, 54, 369/122, 110, 112, 106, 116; 372/34; 346/76 L; 250/205; 350/96.18, 96.15, 96.2

[56] References Cited

U.S. PATENT DOCUMENTS

| | | | |
|---|---|---|---|
| 2,579,177 | 12/1951 | Miles | 88/1 |
| 2,664,024 | 12/1953 | Hansen | 88/14 |
| 2,896,499 | 7/1959 | DeLang | 88/1 |
| 3,284,632 | 11/1966 | Niblack et al. | 250/199 |
| 3,483,389 | 12/1969 | Cronin | 250/219 |
| 3,632,205 | 1/1972 | Marcy | 355/53 |
| 3,669,673 | 6/1972 | Ih et al. | 96/38.3 |
| 3,719,421 | 6/1973 | Poilleux et al. | 356/4 |
| 3,787,888 | 1/1974 | Haskal | 369/106 |
| 3,841,760 | 10/1974 | Guyton | 356/124 |
| 3,866,238 | 2/1975 | Monroe | 369/122 |
| 3,869,193 | 3/1975 | Schmit | 350/6 |
| 3,876,842 | 4/1975 | Bouwhuis | 179/100.41 |
| 3,878,397 | 4/1975 | Robb et al. | 250/551 |
| 3,900,726 | 8/1975 | Tichenor | 240/41.35 |
| 3,913,076 | 10/1975 | Lehureau et al. | 340/173 |
| 3,932,701 | 1/1976 | Adler | 178/6.6 R |

(List continued on Next Page.)

OTHER PUBLICATIONS

Article, "News Spectra—New Type of Flexible Laser Unveiled", Photonics Spectra, Feb. 1986, p. 38.

R. Khol, Optical Computers, Aug. 21, 1969, Machine Design, pp. 117–124.

John Free, Optical Disc Can Store an Encyclopedia, Popular Science, Aug. 82, pp. 47–50.

Melles Griot. Prism Potpourri, Electro-Optical Systems Design, pp. 28–33, Mar. 1976.

M. V. Klein, Optics, John Wiley & Sons, Inc., New York, London, Sydney, Toronto, pp. 500–501.

Millet et al., Research Toward Optical-Fiber Transmission Systems, Proceedings of the IEEE, vol. 61, No. 12, Dec. 1973, pp. 1703–1751.

McCarthy et al., Electro-Optical Information Processing in the Space Domain, pp. 20–30.

M. Griot, Prism Potpourri, Electro-Optical Systems Design, pp. 28–33, Mar. 1976.

Linear and Quarter-Wave Polarizers Cancel Reflected Light, Electromechanical Design, p. 14.

Wieder, Lensless Beam-Addressable Memory Using (List continued on Next Page.)

Primary Examiner—Alan Faber
Attorney, Agent, or Firm—Glenn W. Bowen

[57] ABSTRACT

An optical read/write system is provided in which a laser diode for supplying read and write beams is mounted at a fixed location on a temperature stabilized platform. A single mode, polarizing-preserving optical fiber is connected between the read head and the diode to reduce the mass of the system. The light beam, which upon leaving the laser diodes is generally elliptical in shape, is passed through a magnifying lens before it impinges upon the receiving end of the optical fiber. This changes the generally elliptical shape of the laser beam to a generally circular shape. After passing through the optical fiber the light beam proceeds through an optical assembly which directs a portion of it onto the storage media. Some of the energy of the incoming laser light is reflected to monitoring diode which is coupled to a power control means that controls the power output of the laser. Reflected light from the storage media is also coupled to a second monitoring photo diode to detect data from the read beam that is reflected from the storage media. The write light beam after passing through a polarizing prism is transmitted through a quarter wavelength plate and a demagnifying lens, which directs the light onto the storage media. The demagnifying lens corrects the cross-sectional area of the beam so that it has a circular shape and is approximately the same size as it was upon leaving the laser diode.

10 Claims, 1 Drawing Sheet

U.S. PATENT DOCUMENTS

| | | | |
|---|---|---|---|
| 3,946,150 | 3/1976 | Grafton | 178/6.7 |
| 3,961,223 | 6/1976 | Ray et al. | 315/371 |
| 4,011,400 | 3/1977 | Simons et al. | 358/127 |
| 4,023,033 | 5/1977 | Bricot et al. | 250/201 |
| 4,025,294 | 5/1977 | Teppo | 356/5 |
| 4,025,949 | 5/1977 | Whitman | 358/128 |
| 4,059,841 | 11/1977 | Bricot et al. | 358/128 |
| 4,123,652 | 10/1978 | Bouwhuis | 250/204 |
| 4,135,083 | 1/1979 | Alenu | 369/45 |
| 4,148,584 | 4/1979 | Roelants | 356/5 |
| 4,150,402 | 4/1979 | Tietzl | 369/116 |
| 4,163,149 | 7/1979 | Sawano et al. | 250/204 |
| 4,196,961 | 4/1980 | Walter et al. | 350/6.8 |
| 4,243,952 | 1/1981 | Patterson | 372/34 |
| 4,287,413 | 9/1981 | Kanamaru | 369/45 |
| 4,337,531 | 6/1982 | Willemsen | 369/45 |
| 4,357,104 | 11/1982 | Davinson | 356/4 |
| 4,397,527 | 8/1983 | Geyer | 369/112 |
| 4,458,144 | 7/1984 | Reilly et al. | 250/204 |
| 4,464,741 | 8/1984 | Compaan | 369/45 |
| 4,507,767 | 3/1985 | Takasugi | 369/122 |
| 4,525,625 | 6/1985 | Abe | 250/201 |
| 4,546,460 | 10/1985 | Ando | 369/45 |
| 4,546,463 | 10/1985 | Opheij et al. | 369/110 |
| 4,561,081 | 12/1985 | Janssen et al. | 369/45 |
| 4,562,567 | 12/1985 | Tiordford | 369/116 |
| 4,599,717 | 7/1986 | Bracht et al. | 369/54 |
| 4,603,941 | 8/1986 | Fujii et al. | 350/96.15 |
| 4,603,943 | 8/1986 | Okoshi | 350/96.30 |
| 4,610,506 | 9/1986 | Tokunaga et al. | 350/96.33 |
| 4,625,305 | 11/1986 | Epworth | 370/1 |
| 4,626,679 | 12/1986 | Kuwayama et al. | 250/227 |
| 4,633,170 | 12/1986 | Burns | 324/77 |
| 4,641,914 | 2/1987 | Sheem | 350/96 |
| 4,647,159 | 3/1987 | Baba | 350/413 |
| 4,647,203 | 3/1987 | Jones et al. | 356/345 |
| 4,656,352 | 4/1987 | Langenwalter et al. | 250/277 |

OTHER PUBLICATIONS

Room Temperature Lasers, IBM Technical Disclosure Bulletin, vol. 16, No. 7, Dec. 1973.

LeFebre, Optical Approaches to Mass Data Storage, Data & Communications Design, May–Jun. 1972, pp. 10–12.

Betts, Fiber–Optic Transmit/Receive Couplet, IBM Technical Disclosure Bulletin, vol. 20, 11B, Apr. 1978, pp. 4673–4674.

Hecht, Outlook Brightens for Semiconductor Lasers, High Technology, Jan. 1984, pp. 43–50.

Spatial Filter, NRC, pp. 114–116.

For Optical Information Processing, Mitsubishi Electric Corporation 1985-1-16, DB-6002.

Kawai, Hitachi Cable's Single Polarization Fiber, Hitachi Cable America, Inc.

Rashleigh, Origins & Control of Polarization Effects in Single–Mode Fibers, 1983, IEEE, Journal of Lightwave Technology, vol. LT-1 #1, 6-83, pp. 312–331.

Stolen et al., High-Birefringence Optical Fibers by Preform Deformation, Journal of Lightwave Technology, vol. LT-2 #5, Oct. 84, pp. 639–641.

Simpson et al., A Single-Polarization Fiber, Journal of Lightwave Technology, vol. LT-1, No. 2, Jun. 1983, pp. 370–374.

NSG America, Analysis of Alignment Tolerance in LD to Fiber Coupling, May 1, 1985, (5 sheets).

LD Packaging for SMG Carrying Solfoc Lenses, (9 sheets), (1983).

Kawano et al., Combination Lens Method of Coupling a Laser Diode to a Single-Mode Fiber, Applied Optics/vol. 24 #7/Apr. 1, 1985, pp. 984–989.

FIBER OPTIC READ/WRITE HEAD FOR AN OPTICAL DISK MEMORY SYSTEM

BACKGROUND OF THE INVENTION

At the present time reading and writing in optical disk memory systems requires the critical adjustment and control of components and operational conditions due to environmental tolerances that affect the read/write head. Currently read/write optical heads are relatively expensive and have a higher than desirable mass because they carry the laser diodes that are used for reading and writing. In addition, the implementation of Direct Read After Write (DRAW) is highly desirable but it is costly to implement because of the construction of present day optical read/write heads.

The present invention, by mounting the laser diode on a stationary temperature controlled platform, and by using a polarizing-preserving single mode fiber to make a flexible link between the laser and the optical head, provides a read/write head of approximately one-sixteenth the size and mass of conventional read/write heads, relaxed alignment tolerances and extended temperature ranges of operation. By inserting a magnifying lens at the input to the optical fiber the general elliptically shaped beam that is emitted by the laser diode is converted to a generally circularly shaped beam by placing a collimating lens on the output end of the optical fiber. The elliptical output beam from the laser diode can be substantially matched in size to the effective circular aperture on the input end of the fiber after magnification by the magnifying lens.

The magnifying lens, the laser diode and the polarizing-preserving single mode optical fiber, therefore, all function as a spatial filter which eliminates the problems that are caused by laser diodes which have large astigmatic distances. The use of low cost diodes and the improved feasibility of using closed loop power control are additional features of the present invention.

BRIEF DESCRIPTION OF THE DRAWINGS

The present invention is described by reference to the drawings in which.

TECHNICAL DESCRIPTION OF THE INVENTION

Figure 1:
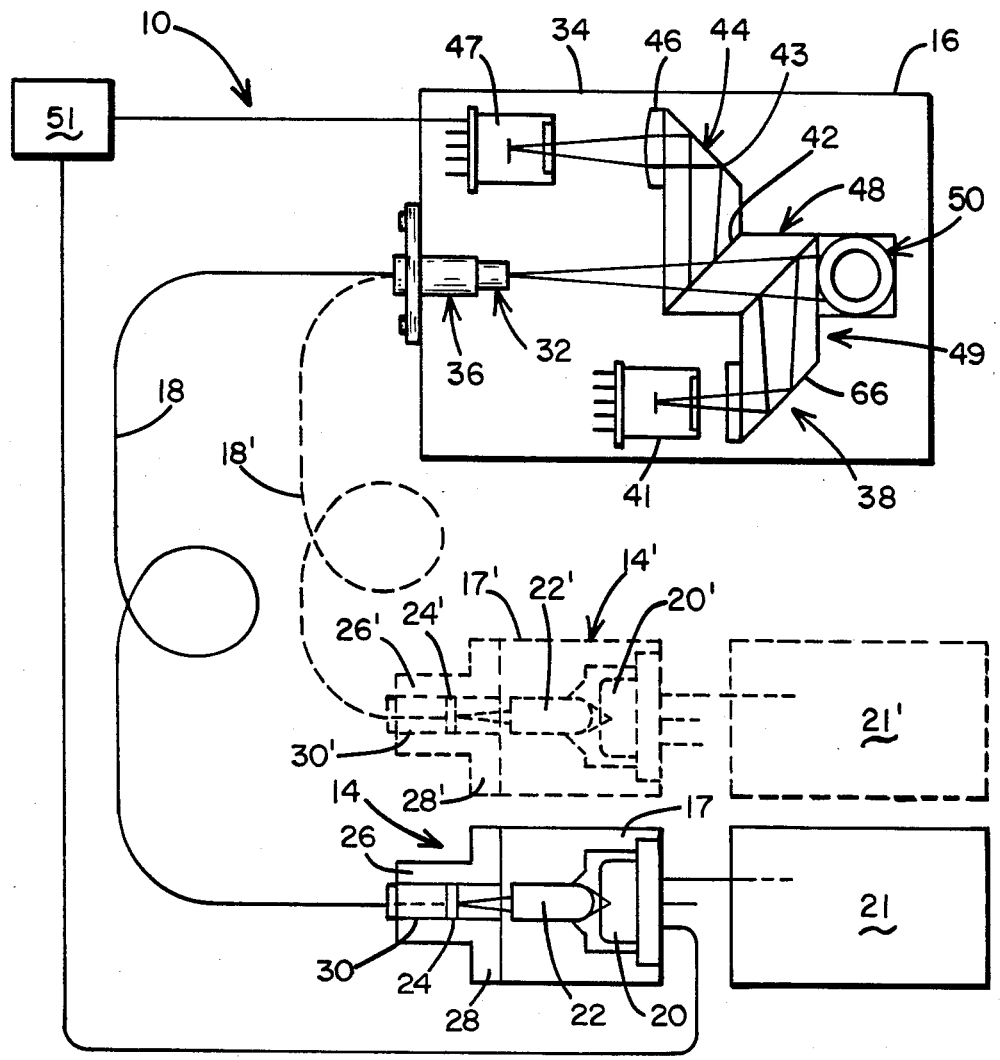
FIG. 1 is a top view of the optical read/write system of the present invention, which shows an alternate additional write laser diode and associated components in dotted lines.
Figure 2:
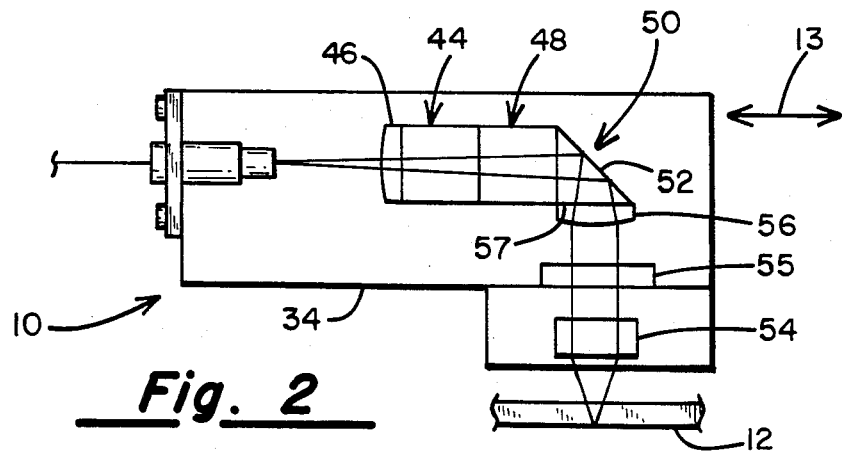
FIG. 2 is a partial side view of FIG. 1 which shows the optical read head and a portion of the optical storage media.

The optical read and write system 10 which is shown in FIGS. 1 and 2 is used to read and write on an optical storage media 12, which may be any type of suitable optical recording media, but which is preferably a rotating optical disk. Optical disks of various types are currently known. One such type of disk has a surface with a thin coating of tellurium. Digital recording of a logical "1" or a logical "0" is obtained by burning, or not burning, a pit into the highly reflective tellurium film surface. A lower powered laser beam is utilized to determine whether a particular bit area is reflective or nonreflective to read the stored data. Various other types of optical media or disks are available which may be employed in conjunction with the present invention.

In contrast to a conventional optical disk read/write systems, and in particular to prior optical digital systems, the laser diode assembly 14 of the present invention is not located on the movable optical read/write head 16. Instead the laser source assembly is located at a fixed remote location on a platform 17, the position and orientation of which is temperature-compensated. The laser beam is coupled to the movable head through a flexible optical fiber 18. The laser source assembly consists of a laser diode 20 which directs its output beam to a self-focusing lens 22, which magnifies the incoming beam from the diode 20. The output of the lens 22 is directed through an anti-reflection disk 24 onto the input end 26 of the optical fiber. The fiber 18 is retained in place in the housing 28 by the fiber mount 30, which is preferably secured to the frame by several means such as laser welding, or an adhesive.

The present invention may be implemented with either one laser, which is utilized for both reading and writing, or by separate read and write lasers. The lasers are preferably laser diodes. Writing on the media 12 may be achieved by operating the laser diode 20 at a high power level, and reading maybe achieved by operating the laser diode at a lower power level, under the control of a power controller 21. Alternately, a second laser assembly 14' may be employed which utilizes a second laser diode 20', wherein one of the laser diodes 20 or 20' is a high powered diode used for writing, and the other is a lower powered diode used for reading. The laser assembly 14' may be identical to the laser assembly 14, and coupling between the read/write head 16' and the assembly 14' may be achieved through the flexible optical fiber 18'. The power controller, in this instance, includes a control section 21 for the laser diode 20 and an additional controller section 21 for the laser diode 20'.

It is well known that conventional laser diodes are subject to an astigmatic effect because of their configurations and dimensions. Thus, the output beam from the laser diode 20 or 20' normally has an elliptical shape, instead of an ideal circular shape. In order to compensate for this effect, the magnifying lens 22 receives the elliptical input beam from the laser diode 20 and magnifies it in such a manner that the beam passing through the lens 22 loses some of its components at the outer ends of the major axis of the elliptical beam as the power passes through the fiber, and thus it acquires a more circular shape. The beam passes through the optical fiber 18 which is a single mode, polarization-preserving optical fiber, which now is available from a number of sources. After passing through the fiber 18, the beam at the transmission end 32 of the fiber 18 will still be substantially circular in shape due to the transmission characteristics of the fiber 18.

The combination of the polarizing-preserving, single mode optical fiber 18 and the lens 22, which receives the wide-angle output of the laser diode 20, functions as a spatial filter for eliminating high spatial frequencies. The second laser such as the laser 20' may be utilized with an additional magnifying lens 22' to reduce the astigmatic effect of the laser diode 20' when its output is transmitted through the flexible fiber 18' to the transmission end 32. Thus in the present invention, the need for beam shaping devices is eliminated, and an output beam of a substantially circular shape may be obtained at the transmission ends 32 for both of the fibers 18 and 18'.

The optical head 16 is mounted on a movable stage 34, as represented by the double-headed arrow 13 in FIG. 2, to allow the optical head to be positioned at the proper location for reading and/or writing on the media 12. The transmission ends 30 of the fibers 18 and 18' are retained in the fiber mount 36, which is secured to the movable stage 34, so that the light transmitted to the fibers 18 and 18' indicated into the optical assembly 38. The optical assembly 38 is preferably formed of optical glass components which are secured together by suitable adhesive to form a unitary optical assembly. In the instance where a single write/read laser diode is employed, a single beam path will be followed both by the high-powered write, and the lower-powered read beams through the assembly 38. In the instance where two laser diodes are used, one for writing such as the laser diode 20 and a second one for reading such as the laser diode 20', the read and write beams will be slightly displaced as shown in FIG. 2. In this instance, the write spot WS and read spot will be slightly displaced from each other, (on the order of 20 microns), or less.

Returning to the description of the optical assembly 38, the incoming beams first passes into the prism 44 which may be of a trapezoidal shape (as viewed in FIG. 1). The prism 44 has an index of refraction and a side 42 angled such that 95% or more of the energy of the incoming beam proceeds through the prism 44. Thus 5%, or less, of the energy of the incoming beam will be reflected from the surface 42, and this will again will be reflected from the angled surface 44 to pass through a focusing lens 46 onto a monitoring diode 47. The purpose of the monitoring diode 47 is to measure the power output of the light beam from the laser diode 20, which is received by the optical assembly 38. Slight variations in the amount of power that is received by the optical assembly can occur due to vibrations or displacement of the major source assembly 14 when the devices are employed in vehicles, or other vibration prone environments.

The output of the monitoring diode 47 is coupled to a power adjusting circuit 51 which increases or decreases the amount of power in the laser beam that is supplied to the optical assembly by the laser diode 20, so as to keep the laser diode power output substantially constant during both the write and read modes, when only one laser diode is used. When both the laser diode 20 is used to write and the laser diode 20' is used to read, the monitoring diode 47 may be employed during the write mode to stabilize the amount of energy supplied by the laser diode 20, and during the read mode the amount of energy supplied by the laser diode 20'.

After 95% of the energy of the incoming light beam passes through the prism 44 it traverses the polarizing prism 48. Because of the polarizing-preserving, single mode optical fiber 18, the known polarization of the beam passing through the optical assembly 38 is aligned so that it passes through the prism 48 from left to right, as shown in FIG. 2. After traversing the polarizing prism 48, the light bean passes through a portion of the rhomboid prism 49 into the right-angle prism 50 where it is reflected off of the angled wall 52 downwardly at a 90° angle toward the media 12. The light next passes through the lens 56 which is affixed to the bottom face 57 of the right-angle prism 50. The light emitted from the lens 56 then passes through a quarter wavelength plate 55. Since the incoming beam in the case of either the write beam, or the read beam, will be substantially linearly polarized, the effect of the quarter wavelength plates is to provide a circularly polarized beam to the objective lens 54, which will focus either the write beam, or the read beam, onto the optical disk 12. The lens 54, is an objective or a demagnifying lens, which serves to provide a circular beam of approximately the same area as the beam that was originally supplied by a laser diode, such as the laser diode 20 or 20', at the input end of an optical fiber 18 or 18'.

Light reflected from the media 12 during the read mode is passed through the lens 54, the quarter-wavelength plate 55, the lens 56, the prism 50 and through the prism 49, (due to the polarization change that occurs in the light beam in passing through the quarter-wavelength plate twice), to the angled side 66 of the rhomboid prism 49, onto a monitoring diode 41, which reads out the detected data.

What is claimed is:

1. An optical storage system comprising a storage means, light source means for directing a light beam onto said storage means comprising laser means for producing a directed laser beam, first and second beam-splitting means, first and second monitoring means, optical conduit means coupled to said laser means for receiving and supplying said directed laser beam onto said first beam-splitting means which in turn directs a major portion of said directed laser beam onto said storage means, which produces a reflected directed beam from said storage means and a reflected portion of said reflected directed laser beam from said storage means onto said first monitoring means for monitoring said reflected directed laser beam and power control means coupled to said second monitoring means and said laser means wherein said second beam-splitting means directs a minor portion of said directed laser beam onto said second monitoring means before said directed laser beam is directed onto said storage means and said power control means adjusts to power of said laser means to control the power of said directed laser beam.

2. In an optical storage system as claimed in claim 1 the improvement wherein said beam-splitting means comprises polarizing prisms.

3. An optical storage system as claimed in claim 1 wherein said optical conduit means comprises a flexible single-mode, polarization-preserving optical fiber means coupled to said laser means and, said laser means is located at a fixed location.

4. In an optical storage system as claimed in claim 3 the improvement comprising magnifying means interposed between said laser diode means and said optical fiber means for shaping the beam passing through said optical fiber means from a generally elliptical beam to a more circular beam.

5. In an optical storage system as claimed in claim 4 the improvement comprising a demagnifying means coupled to receive the light beam after it passes through said optical fiber means and before it is directed onto said storage media for providing a spot of light at said storage means of approximately the same cross-sectional area as the beam which entered said optical fiber means.

6. In an optical storage system as claimed in claim 5 quarter-wavelength plate positioned so that said demagnifying means is located between said plate and said optical storage media.

7. In an optical storage system as claimed in claim 6 a quarter-wavelength plate positioned between said demagnifying means and said optical storage media.

8. In an optical storage system as claimed in claim 3 the improvement comprising magnifying means positioned between said laser means and said optical fiber means for shaping the directed laser beam that passes through said optical fiber means from a generally elliptical beam to a more circular beam.

9. In an optical system as claimed in claim 8 a quarter-wavelength plate positioned between said demagnifying means and said optical storage media.

10. In an optical storage system as claimed in claim 3 the improvement comprising a demagnifying means coupled to receive the light beam after it passes through said optical fiber means and before it is directed onto said storage media for providing a spot of light at said storage means of approximately the same cross-sectional area as the directed laser beam which enters said optical fiber means.

* * * * *

UNITED STATES PATENT AND TRADEMARK OFFICE
CERTIFICATE OF CORRECTION

PATENT NO. : 4,799,210
DATED : January 17, 1989
INVENTOR(S) : Mark L. Wilson, Bernard S. Fritz It is certified that error appears in the above-identified patent and that said Letters Patent is hereby corrected as shown below:

Column 3, line 20, delete "WS".

Column 4, line 37, delete "to" and substitute -- the -- .

Signed and Sealed this

Thirtieth Day of May, 1989

Attest:

DONALD J. QUIGG

Attesting Officer

Commissioner of Patents and Trademarks